(12) United States Patent
Garceau et al.

(10) Patent No.: US 11,572,019 B2
(45) Date of Patent: Feb. 7, 2023

(54) EXTENDING AND RETRACTING STEP ASSEMBLY

(71) Applicant: Norco Industries, Inc., Compton, CA (US)

(72) Inventors: Bernard F. Garceau, Vandalia, MI (US); Bori Krobot, LaPorte, IN (US)

(73) Assignee: NORCO INDUSTRIES, INC., Compton, CA (US)

( * ) Notice: Subject to any disclaimer, the term of this patent is extended or adjusted under 35 U.S.C. 154(b) by 72 days.

(21) Appl. No.: 17/162,578

(22) Filed: Jan. 29, 2021

(65) Prior Publication Data
US 2021/0245665 A1    Aug. 12, 2021

Related U.S. Application Data

(60) Provisional application No. 62/972,219, filed on Feb. 10, 2020.

(51) Int. Cl.
*B60R 3/02*    (2006.01)

(52) U.S. Cl.
CPC ..................................... *B60R 3/02* (2013.01)

(58) Field of Classification Search
CPC ....................................................... B60R 3/02
See application file for complete search history.

(56) References Cited

U.S. PATENT DOCUMENTS

| | | |
|---|---|---|
| 2,209,576 A | 7/1940 | Mcdonald |
| 2,764,422 A * | 9/1956 | McDonald ................ B60R 3/02 |
| | | 182/91 |
| 2,809,849 A | 10/1957 | Benne |
| 3,645,557 A | 2/1972 | Aldropp et al. |
| 3,743,320 A | 7/1973 | Clark |
| 3,807,757 A * | 4/1974 | Carpenter ................ B60R 3/02 |
| | | 182/95 |
| 4,110,673 A | 8/1978 | Emery et al. |
| 4,369,984 A | 1/1983 | Hagen |
| 4,623,160 A | 11/1986 | Trudell |
| 4,909,700 A | 3/1990 | Fontecchio et al. |
| 5,341,897 A | 8/1994 | Gross |
| 5,547,040 A | 8/1996 | Hanser et al. |
| 5,957,237 A | 9/1999 | Tigner |
| 6,082,751 A | 7/2000 | Hanes et al. |
| 6,213,486 B1 | 4/2001 | Kunz et al. |
| 6,655,706 B1 | 12/2003 | Murrell |
| 6,659,224 B2 | 12/2003 | Medsker |
| 6,869,092 B1 | 3/2005 | Henn |

(Continued)

OTHER PUBLICATIONS

Lippert Step Assemblies. Lippert Components. 6 pages.

*Primary Examiner* — Bryan A Evans
(74) *Attorney, Agent, or Firm* — Vorys, Safer, Seymour and Pease LLP; Mark A. Watkins (57) ABSTRACT

The present disclosure is directed to a staircase assembly for a vehicle, such as a recreational vehicle (RV). The stair case assembly includes a pair of substantially flat, spaced apart, support brackets that are configured to mount to a vehicle, and define a storage space for a linkage system and associated plurality of steps. The linkage system is configured to move the plurality of attached steps from a vertically orientated stored position to a horizontally oriented deployed position extending outwardly from the vehicle allowing a person to easily enter and exit the vehicle.

19 Claims, 7 Drawing Sheets

(56) References Cited

U.S. PATENT DOCUMENTS

| | | |
|---|---|---|
| 7,168,722 B1 | 1/2007 | Piotrowski et al. |
| 7,448,637 B2 | 11/2008 | Parker |
| 7,857,337 B2 | 12/2010 | Ferguson et al. |
| 7,878,519 B2 | 2/2011 | Hallmark |
| 8,075,008 B1 | 12/2011 | Hanser et al. |
| 8,556,283 B2 | 10/2013 | Coochesfahani |
| 8,770,607 B2 | 7/2014 | Rasekhi |
| 9,010,473 B1 | 4/2015 | Rasmussen et al. |
| 9,527,448 B1 | 12/2016 | Kay et al. |
| 2007/0221442 A1 | 9/2007 | R.C. |
| 2020/0369211 A1* | 11/2020 | Kay ........................ B60R 3/007 |

* cited by examiner

EXTENDING AND RETRACTING STEP ASSEMBLY

CROSS-REFERENCE TO RELATED APPLICATIONS

This application claims priority to and the benefit of U.S. Provisional Patent Application No. 62/972,219 filed Feb. 10, 2020, which is hereby incorporated by reference in its entirety.

FIELD

The present disclosure relates to step assemblies for vehicles and, more particularly, the present disclosure relates to a foldable stair assembly foldable between a retracted position where each step of a plurality of steps is in a vertical orientation and an extended position where each step of the plurality of steps deploys and unfolds into in a horizontal orientation.

BACKGROUND

Various vehicles, including but not limited to recreational vehicles (RVs), motor homes, campers, vans and the like, include a doorway or other type of portal for accessing an interior of the vehicle's enclosure. The doorway/portal may be located high above ground level, in some cases by several feet, making access to the RV difficult and potentially hazardous. Accordingly, one or more steps may be employed to facilitate ingress and egress to the doorway of the vehicle. Existing designs have realized a preference for steps that compactly store under, within, or close to the vehicle, such that when stowed, the step(s) does/do not affect the overall dimensions of the vehicle and to provide the RV or other structure more sleek and/or aesthetically pleasing appearance when stowed. However, state law may regulate the maximum width of these vehicles, for example, to 102 inches.

One solution is to use a drawbridge-style stair system that pivots up and stores within a doorframe of the vehicle. However, these stair systems require a significant space for swinging the drawbridge-style stair system into a desired position, which may be a concern when parking the vehicle in tight spaces.

Another solution is to use an extendable/folding stair system. However, current folding designs can be cumbersome to deploy and often require multiple user movements, e.g., pulling out to extend a series of stairs and flipping a base stair out. Other designs require the manipulation of locking mechanisms prior to deploying the stair system. Many current designs are also free floating, having at least one stair attached to the vehicle, with no support structure thereof in contract with the ground. Many of these extendable/folding designs are generally not aesthetically pleasing as many are suspended from the base of the RV floor and are observed as a set of internally stacked stairs.

The present disclosure provides certain improvements including but not limited to, easy deployment and retraction, increased stability, and flat vertical secured storage that is aesthetically pleasing.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In accordance with one aspect of the present disclosure, described are exemplary extending and retracting stair assemblies configured to mount to a vehicle. An exemplary stair assembly includes a pair of substantially flat, spaced apart, support brackets configured to mount to the vehicle, wherein each support bracket has an inner-facing surface and an-outer facing surface. The stair assembly also includes a linkage system pivotally connected to the support brackets and configured to move a plurality of attached steps from a vertically orientated stored position located between the pair of support brackets to a horizontally oriented deployed position extending outwardly from the vehicle.

In some embodiments, the linkage system further includes a front linkage bar pivotally connected to the inner surface of each support bracket and a rear linkage bar pivotally connected to the inner surface of each support bracket. A set of scissor links are pivotally connected to each support bracket via the front linkage bar and rear linkage bar. Each set of scissor links includes a plurality of scissor links connected to one another at scissor link ends and are pivotally connected at each scissor link center.

In some embodiments, the stair assembly further comprising at least one linkage stop member configured to prevent movement of the plurality of stairs beyond the horizontally deployed position.

In some embodiments, the stair assembly further includes at least one stabilizer fixedly connected to the linkage system and is configured to support the stair assembly in a deployed state via contact with a ground surface. The stabilizer may include an adjustable leg configured to slidably engage a hollow tube member.

In some embodiments, each of the support brackets includes a hook extending frontward from a support bracket front edge, each hook defining an arcuate guide channel configured to receive and guide a locking projection connected to, and extending perpendicularly from, a bottom scissor link of the linkage system.

In some embodiments, the stair assembly further includes a skirt panel, fixedly connected to a bottom step of the plurality of steps. The skirt panel is substantially planar with a skirt of the vehicle when the stair assembly is in the stored/retracted position.

In some embodiments, a handle is fixedly connected to a bottom step of the plurality of steps, the handle having a grasping portion configured to ergonomically receive an operator's hand for applying a force to the linkage system.

In accordance with another aspect of the present disclosure, a method of deploying an extendable stair assembly mounted to a vehicle is provided. The method includes providing an extendable stair assembly having a stored state and deployed state. The stair assembly including a pair of substantially flat, spaced apart, support brackets configured to mount to the vehicle, each support bracket having an inner-facing surface, an outer-facing surface, and a front hook extending outwardly from a support bracket front edge. Each front hook defines an arcuate guide channel in the support bracket that is configured to receive and guide a locking projection connected to, and extending perpendicularly from, a bottom step. The stair assembly also includes a linkage system configured to move a plurality of attached steps from a vertically orientated stored state located between the pair of support brackets to a horizontally oriented deployed state extending outwardly from the vehicle. The method further includes applying a lifting force opposing gravity to free the locking projection from the support bracket hook and guide channel, and then applying a pulling force substantially perpendicular to a side of the vehicle, extending the linkage system and deploying each of the steps to a horizontal orientation.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Figure 1:
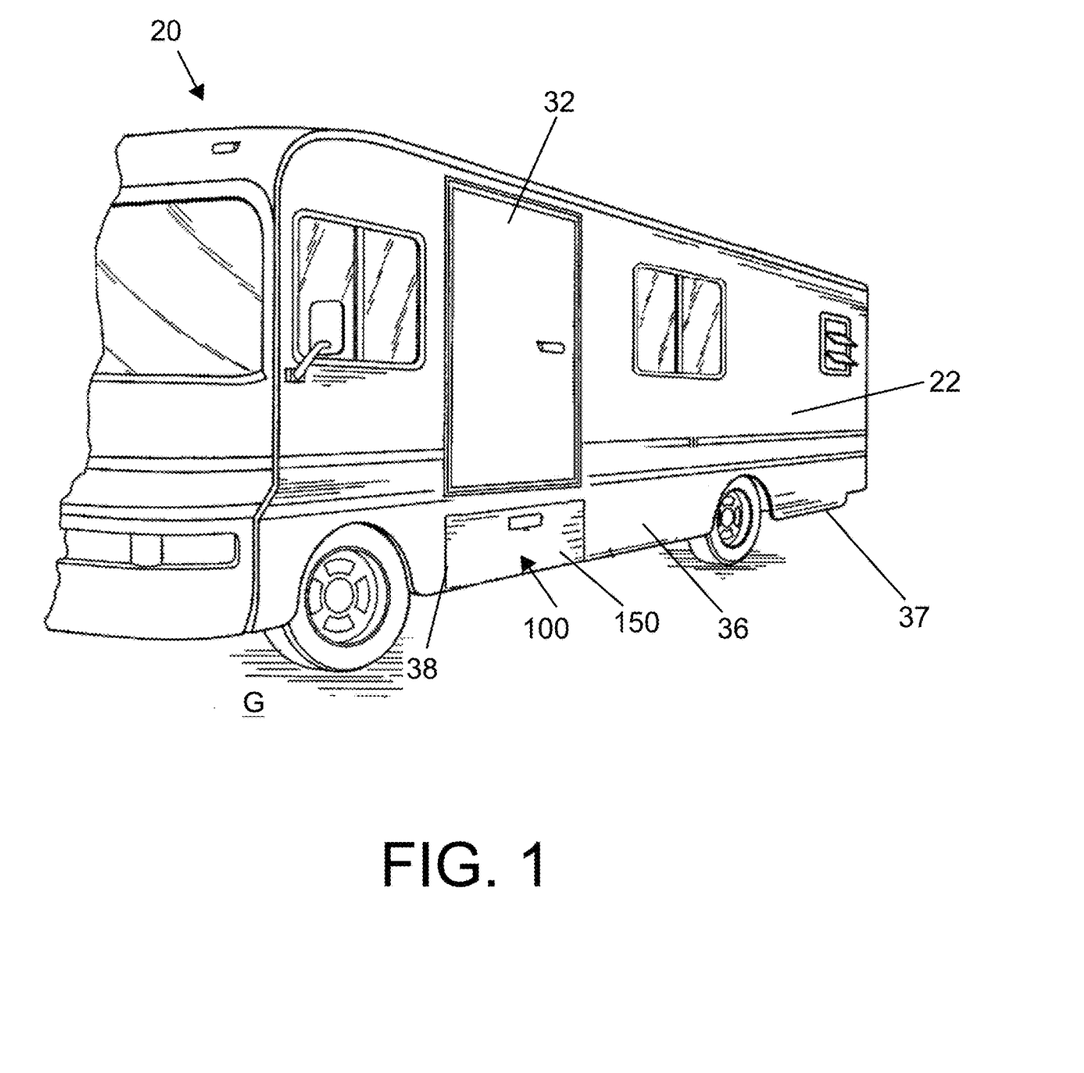
FIG. 1 is a partial perspective view of a recreational vehicle incorporating a staircase assembly in accordance with the present disclosure, illustrating the staircase assembly in the retracted position.

With reference to FIG. 1, exemplary embodiments of the present disclosure relate to a staircase assembly 100 for an exemplary vehicle 20. The vehicle 20 may be a self-powered vehicle, such as a recreational vehicle (RV), or may be a trailer which is adapted to be towed, e.g., by an automobile or a truck tractor. The vehicle 20 may be one which is designed for living (as a house trailer), or may be a work vehicle (e.g., a mobile library). In any case, a vehicle 20 according to this disclosure comprises a vehicle body 22 having a plurality of exterior walls, e.g., a roof, a front wall, side walls, and a rear wall. The interior of the vehicle body 22 also has a floor. Beneath the floor is an underframe (not shown) for supporting the vehicle body 22, the underframe may be conventional. At least one of the exterior walls, here shown as the, has a doorway (or portal) 32 allowing a person to enter and exit from the interior of the vehicle body 22. While the doorway 32 is illustrated as being on the left side of the vehicle, it is to be appreciated that the doorway 32 may be placed on either or both sides of the vehicle body 22, and/or on any one or more of the other exterior walls of the vehicle body 22. Each of the side walls (only the left side wall is shown) has a lower portion or skirt 36, which is disposed below the floor of vehicle 20 and which terminates in a lower edge 37. Under and proximate to the doorway 32 is a cavity 38 for receiving a staircase assembly 100. In FIG. 1, the cavity 38 is obscured from view as the staircase assembly 100 is illustrated retracted or stowed within the cavity 38, according to one or more embodiments of the present disclosure. The cavity 38 may define an opening in the skirt 36 and the staircase assembly 100 may be configured with various geometries to cover the opening in the skirt 36. Here, for example, the cavity 38 defines a rectangular opening in the skirt 36 and the staircase assembly 100 includes a correspondingly sized rectangular shaped skirt for covering the rectangular opening in the skirt 36.

Figure 2:
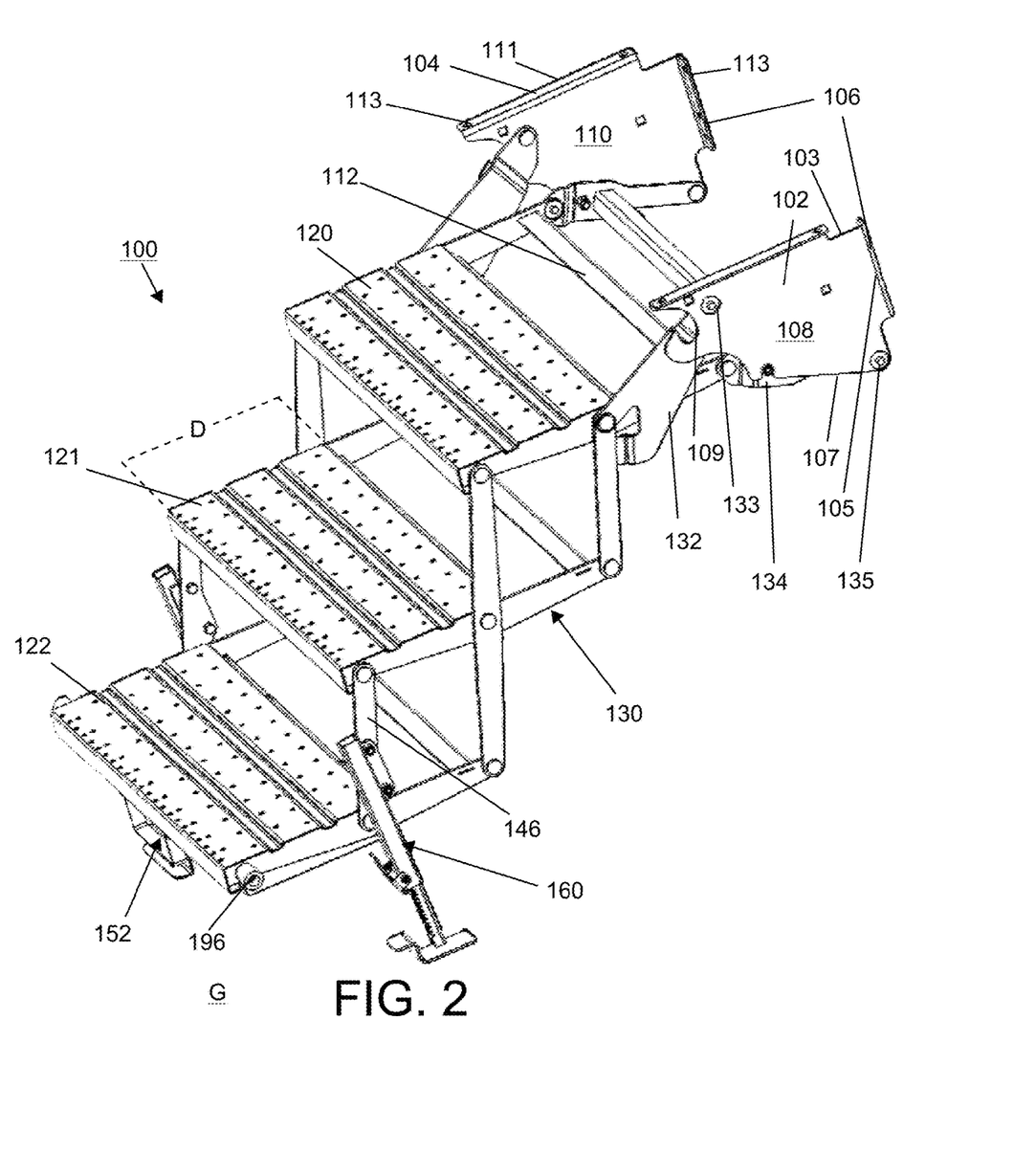
FIG. 2 is a perspective view of an exemplary stair assembly in an extended position in accordance with the present disclosure.
Figure 3:
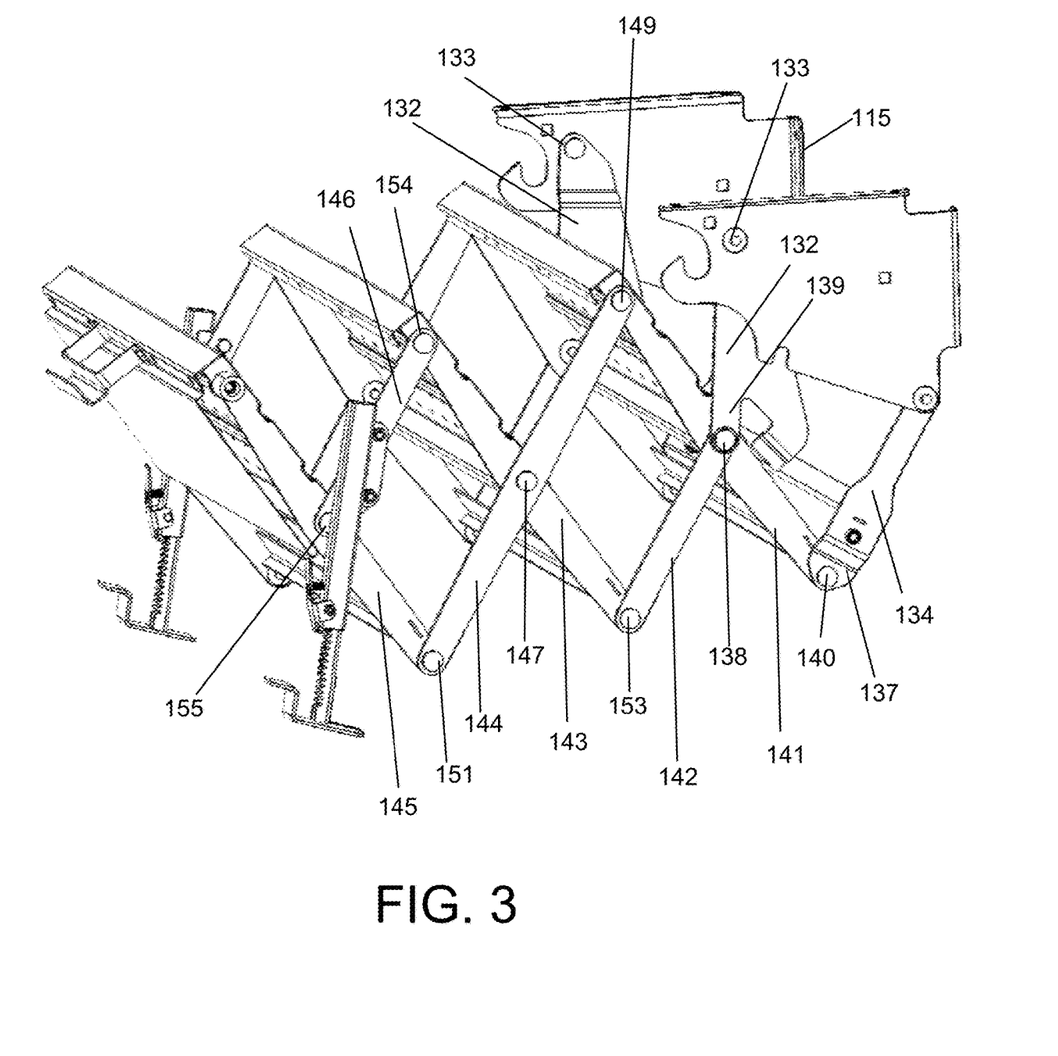
FIG. 3 is a perspective view of an exemplary stair assembly in a partially extended/retracted position in accordance with the present disclosure.
Figure 4:
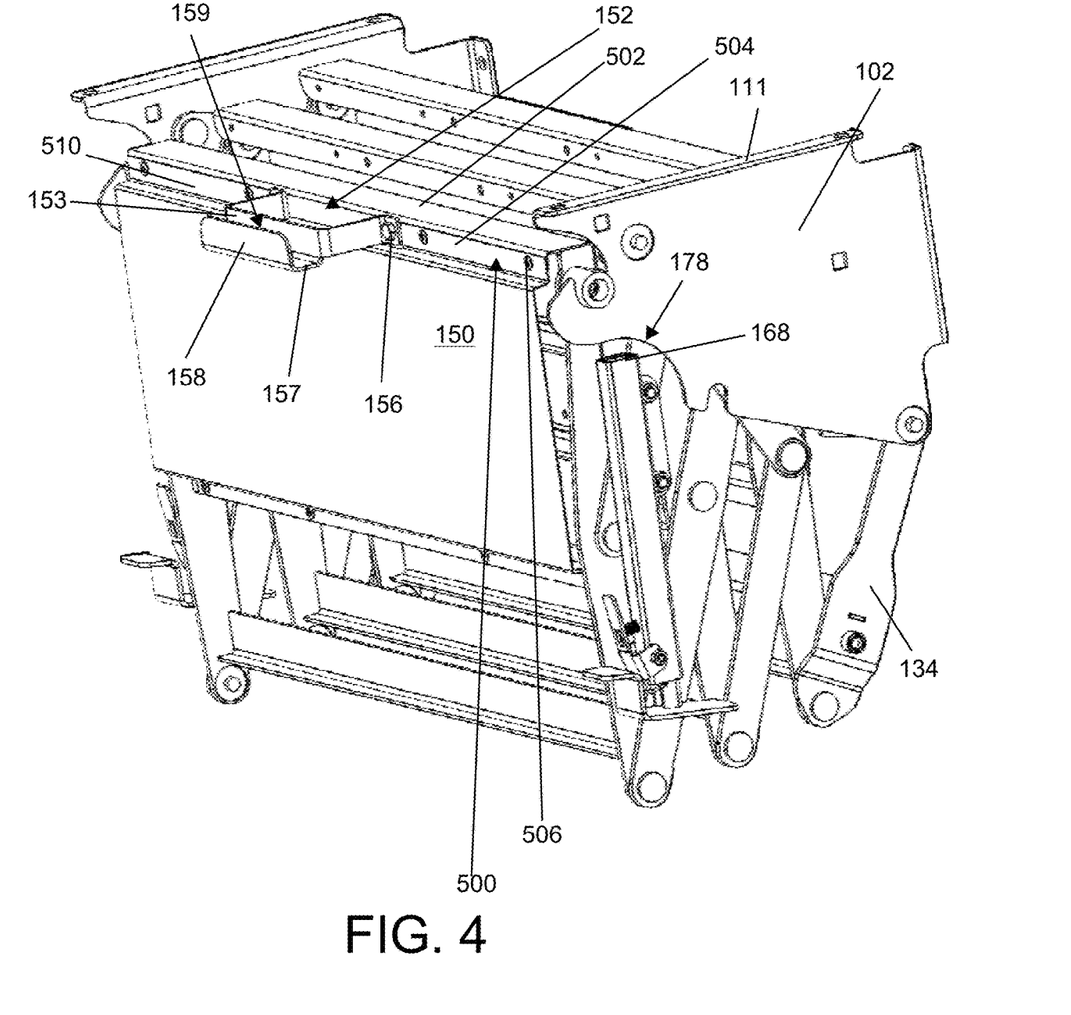
FIG. 4 is a perspective view of an exemplary stair assembly in a retracted position in accordance with the present disclosure.

Referring now to FIGS. 2-4, illustrated therein is an exemplary stair assembly 100 for attachment to a structure, according to one or more embodiments of the present disclosure. The stair assembly 100 includes a pair of parallel, substantially flat, support brackets 102 in a spaced-apart relationship on opposing ends of the stair assembly 100. Each support bracket 102 has a substantially flat outer-facing surface 108 and a substantially flat inner-facing surface 110. Each support bracket 102 is shaped as an irregular polygon having a top edge 103, a rear edge 105, a bottom edge 107, and front edge 109. However, it is to be appreciated that the number of edges and irregular polygon shape is not limiting and that the shape of the support bracket 102 may take any form that accommodates the operation and/or installation of the stair assembly 100 to the structure, such as a vehicle 20, without deviating from the scope of the present disclosure. In the exemplary embodiment illustrated in FIGS. 2-4, the top edge 103 and rear edge 105 are substantially perpendicular to one another. The bottom edge 107 is angled with respect to the rear edge 105. In some embodiments, the rear edge 105 and bottom edge 107 form an angle less than 90 degrees.

Each support bracket 102 also includes a horizontal flange 104 located along at least a portion of the top edge 103. A top surface 111 of the horizontal flange 104 is generally perpendicular to the outer surface 108 of the support bracket 102. In the exemplary embodiment of FIGS. 2-4, the horizontal flange extends outwardly from the outer surface 108 of the support bracket 102. This allows an installer of the stair assembly 100 to easily reach at least one aperture 113 configured to receive a fastener for securing each of the support brackets 102 to the vehicle 20, described in greater detail below.

Each support bracket 102 also includes a vertical flange 106 located along at least a portion of a rear edge 105. A rear surface 115 of the vertical flange 106 is generally perpendicular to both the outer surface 108 of the support bracket 102 and the top surface 111 of the horizontal flange 104. Each of the top and rear flange surfaces 111, 115 provides a planar face for connecting the stair assembly 100 to frame members or surfaces of the vehicle 20. In some embodiments, the horizontal flanges 104 are configured to abut and attach to the bottom floor of the vehicle 20 via at least one fastener described in greater detail below and the vertical flanges 106 are configured to abut and attach to the rear wall of the cavity 38 via at least one fastener described in greater detail below.

Each of the top flange 104 and rear flange 106 include at least one aperture 113 therethrough. Each aperture 113 is configured to receive a fastener (not pictured), for example and without limitation, a bolt, for securing each support bracket 102 to a portion of a frame of a vehicle 20. That is, in some embodiments, the at least one fastener is threaded through an aperture 113 and tightened/secured to the vehicle frame such that the stair assembly 100 is firmly connected to the vehicle 20 generally proximate to a doorway/portal 32. For example, stair assembly 100 may be suspended from the bottom of the vehicle 20 generally within the cavity 38.

The stair assembly 100 includes a plurality of steps 120, 121, 122 that are supported by a linkage system (or linkage assembly) 130. The linkage system 130 operates to place each step 120-122 in a substantially horizontal orientation when the linkage system 130 is in a fully extended state (as illustrated in FIG. 2) and a substantially vertical orientation when the linkage system 130 is in a fully retracted state (as illustrated in FIG. 4). In some embodiments, the linkage system 130 is configured to scissor between an extended position, where the steps 120-122 are each deployed in a substantially horizontal orientation (as illustrated in FIG. 2), and a retracted position where the steps 120-122 are each folded into a vertical orientation (as illustrated in FIG. 4).

The linkage system 130 may include two sets of linkage bar pairs 132, 134 and scissor links arranged in a spaced mirror-image relation to one another. For simplicity, the linkage system 130 will be described herein according to one set of the individual linkage bars and scissor links on one side of the stair assembly 100, as illustrated in the foreground of FIGS. 2-4. The pair of linkage bars and scissor links of the linkage system 130 are connected with one another via crossbars 112 and steps 120-122 (described in detail below) so that the entire linkage system 130 moves in a uniform organized manner. Each side of the linkage system 130 includes an elongated front linkage bar 132 pivotally connected to an inward facing surface 110 of the support bracket 102 at a top pivot point 133, proximate to the front edge 109 and top edge 103. Each side of the linkage system 130 also includes an elongated lower linkage bar 134 pivotally connected to an inward facing surface 110 of the support bracket 102 at a rear pivot point 135, proximate to the rear edge 105 and bottom edge 107. In some embodiments and as illustrated in FIG. 2, the rear pivot point 135 is closer to the ground G, than the top pivot point 133.

The front linkage bars 132 and rear linkage bars 134 are pivotally coupled to a plurality of scissor links which are pivotally connected to one another at each scissor link end and are pivotally connected at their centers. That is, the plurality of scissor links are pivotally connected to the support brackets 102 through the front and rear linkage bars 132 and 134, respectively, allowing the linkage system 130 to extend from and compactly retract to the region between the spaced-apart support brackets 102. With this movement, the linkage bars 132, 134 rotate which also provides for the rotation of the linkage system 130 such that the steps 120-122 attached to respective scissor links are able to rotate, from a horizontal deployed state, to a vertical retracted state, as discussed in greater detail below.

In the exemplary embodiment illustrated in FIGS. 2-4, the linkage bars 132, 134 are pivotally connected to a scissor link portion of the linkage system 130, wherein the scissor link portion is herein defined as the collection of each scissor link in the linkage system, excluding the linkage bars 132, 134. That is, a scissor end 137 of the lower linkage bar 134 is pivotally connected to a rear terminal end of a top inner scissor link 141 at pivot point 140. A scissor end 139 of the front linkage bar 132 is pivotally connected to a midpoint 138 of the top inner scissor link 141. The linkage system 130 includes a plurality of scissor links that operate to extend and retract the plurality of steps 120-122. In the exemplary embodiment of FIGS. 2-4, the stair assembly 100 includes three steps 120-122 fixedly connected to and supported by the linkage system 130 having a top inner scissor link 141, a middle inner scissor link 143 and a bottom inside scissor link 145. The linkage system 130 further includes a top outer scissor link 142, a middle outer scissor link 144 and a bottom outer scissor link 146. Scissor links 141, 143, 144, and 145 may be of substantially equal length. The lengths of the top outer scissor link 142 and bottom outer scissor link 146 may each be lesser than the length of the scissor links 141, 143, 144, 145, for example, about half the length of scissor links 141, 143,144, and 145. Thus, the linkage system 130 illustrated and described herein includes a first scissoring linkage assembly at a first side of the stair assembly 100, and a second scissoring linkage assembly at a opposing second side of the stair assembly 100, with the first and second scissoring linkage each comprising a set of linkage bars 132, 134 and scissor links 141, 142, 143, 144, and 145.

Scissor links 143 and 144 are pivotally connected at their midpoints at pivot point 147. In addition, a front end of the top inner scissor link 141 is pivotally connected to a top end of outer scissor link 144 at a pivot point 149. Furthermore, a lower end of middle outer scissor link 144 is pivotally connected to a rear end of the bottom inner scissor link 145 at pivot point 151. The top outer scissor link 142 is pivotally connected to a rear end of the middle inner scissor link 143 at pivot point 153, and the top outer scissor link 142 is pivotally connected to the top inner scissor link 141 at the midpoint 138 of the top inner scissor link 141. The bottom outer scissor link 146 is pivotally connected at one end to a mid-point of the inner bottom scissor link 145 at pivot point 155 and at the other end to the front end of middle inner scissor link 143 at pivot point 154. While the scissor link portion of linkage system 130 is illustrated as having three inner and three outer links, it is to be appreciated that a fewer or greater number of sets of links may be provided to accommodate a desired amount of steps (fewer or more).

Each step 120-122 is a substantially flat rectangular plate that is fixedly attached to identical opposing scissor links of on each side of the linkage system 130. In the exemplary embodiment of FIGS. 2-4, top step 120 extends transversely between each top inner scissor link pair 141. The middle step 121 extends transversely between each middle inner scissor link pair 143. The bottom step extends transversely between each bottom inner scissor link pair 143.

Each step 120-122 has a depth D that is dimensioned to support a person's foot. That is, each step 120-122 extends from the front distal end of its associated scissor link pair rearwards toward a rear distal end of its associated scissor link pair. In some embodiments and as illustrated in FIGS. 2-4, each step 120-122 extends from the front distal end of the associated scissor link to at least past the mid-point of the associated scissor link. For example, step 121 is illustrated as extending from the front distal end of the scissor link 143 to slightly past pivot point 147. It is to be appreciated, however, that the depth D of each step 120-122 may vary depending on the application. Furthermore, it is contemplated that different steps e.g., step 120 of a stair assembly 100, may have a depth D that is different from other steps, e.g., 121,122.

Figure 5:
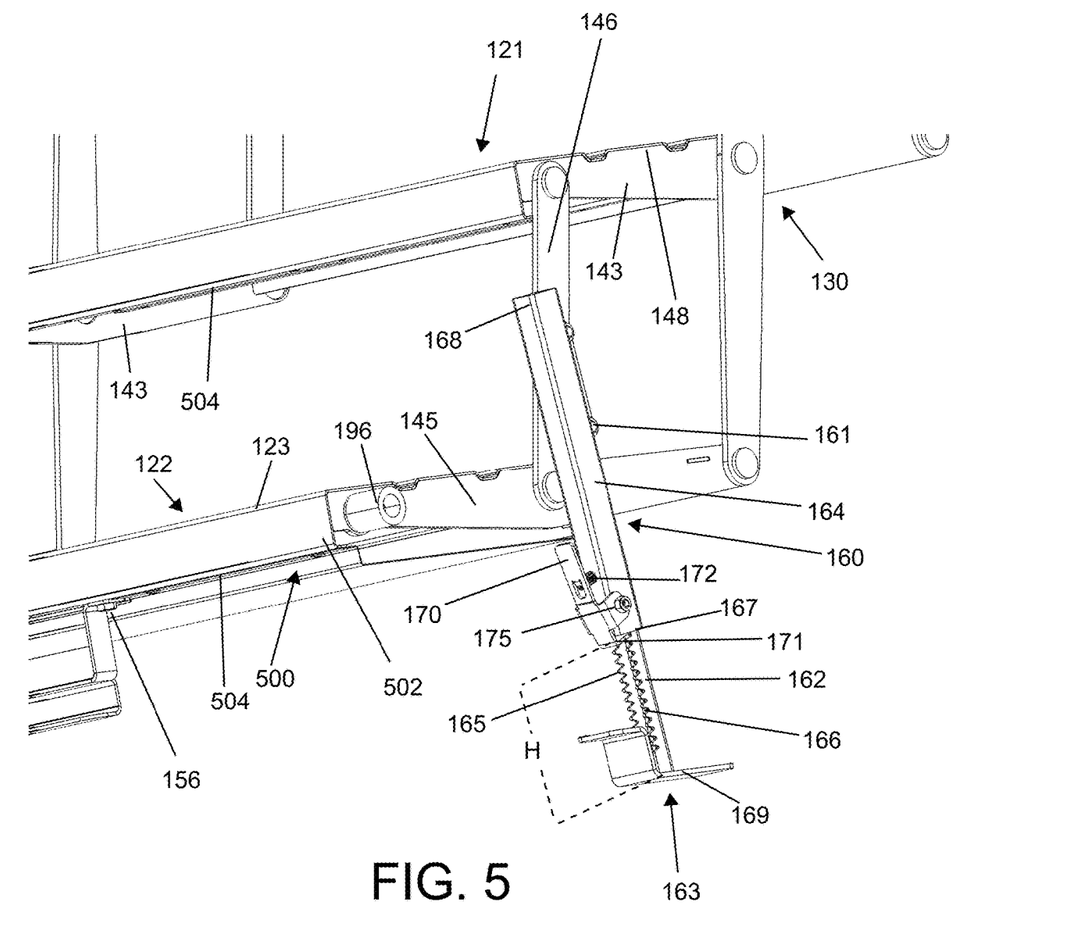
FIG. 5 is a perspective view of exemplary stair assembly having a stabilizer in accordance with the present disclosure.

In some embodiments and as illustrated in the exemplary embodiment of FIG. 5, each step (steps 121,122 are illustrated) is connected to its corresponding scissor link pair along a top edge of each scissor link and extending a distance D. For example, middle step 121, is connected to top inner scissor link pair 143 along a top link edge 148. In some embodiments, a bottom surface of the step 120-122 rests upon and is fixed to the top link edge 148 of each corresponding scissor link. In other embodiments, the top link edge 148 of each scissor link pair associated with the step 120-122 is fixedly attached to and generally co-planar with its associated step 120-122.

With continued reference to FIGS. 2-4, the linkage system 130 provides for each step 120-122 of the stair assembly 100 to be substantially parallel relative to each other and relative to the ground G when deployed in an extended state during use. The horizontal arrangement of the steps 120-122 in the extended state allows a person to ascend/descend the plurality of steps 120-122 to enter/exit the vehicle. The linkage system 130 further allows the each step 120-122 of the stair assembly 100 to have a substantially vertical arrangement with respect to the ground G, and parallel to each other step when in a retracted state. The substantially vertical arrangement of the and depth of an vehicle cavity 38, wherein the stair assembly 100 is installed, allows the steps 120-122 to fold on top of each other, with the bottom face of the bottom step 122 being substantially flush with the skirt of the vehicle, such as skirt 36 of vehicle 20 exemplified in FIG. 1.

In some embodiments and with particular reference to FIGS. 1 and 4, a skirt panel 150 is fixed to a bottom surface of the bottom step 122. The skirt panel 150 may be of the same material and design as the skirt 36 of the vehicle 20 so that the stair assembly 100 blends in to the skirt 36 surrounding the stair assembly 100 and is thus aesthetically pleasing in the retracted position. That is, the skirt panel 150 allows the retracted stair assembly 100 to blend into the skirt 36 of the vehicle 20 and provide a substantially continuous skirt design along the bottom of the vehicle 20, as illustrated in FIG. 1. In some examples, the skirt panel 150 is a portion of the skirt 36 that is cut away, e.g., during manufacture, maintenance and/or retrofit, to define an opening in the skirt 36 behind which the cavity 38 is provided. In this manner the skirt panel 150 may fully cover substantially the entire opening defined in the skirt 36, thereby providing the vehicle 20 with a seamless appearance.

In some embodiments one or more of the steps 120-122 is configured with an attachment surface onto which a handle or other accessories or features may be mounted. For example, FIGS. 4 and 5 illustrate an embodiment where the step 122 includes an L-shaped front flange 500 initially extending perpendicularly from a front edge 123 of the step 120-122 associated therewith (here, for e.g., the front edge 123 of the step 122). In the illustrated example, the L-shaped front flange 500 includes a front facing surface 502 and a bottom-facing surface 504. Here, the front facing surface 502 and the bottom-facing surface 504 are arranged in perpendicular relationship relative to each other, but they may be differently oriented depending on the equipment, feature, or accessory to be mounted thereto. As mentioned, the L-shaped front flange 500 may be configured to provide an attachment surface for attaching a handle, skirt panel and the like. Here, the bottom-facing surface 504 is configured as an attachment surface having a plurality of fastener holes 506 configured to receive a fastener, e.g., fastener 156, for attaching a structure to the bottom-facing surface 504. In the exemplary embodiment of FIGS. 2-4, the skirt panel 150, may include an attachment surface 510 configured to abut and connect to the bottom facing surface 504 of the L-shaped front flange 500. The attachment surface 510 may be a recessed portion of the otherwise flat panel 150. The skirt panel 150 may attach to the bottom of the step 122 by fasteners (e.g., the fasteners 156), adhesives, etc., and the like.

The stair assembly 100 may also include hardware or accessories for aiding a user when extending and/or retracting the stair assembly 100. In the illustrated example, the stair assembly 100 includes a handle 152 fixedly attached to the bottom surface of the bottom step 122. The handle 152 includes a grasping portion 153 configured to ergonomically receive a hand of a user such that the user may manipulate the stair assembly 100 and linkage system 130 by pulling or pushing to either extend or retract and store the plurality of steps 120-121. In some embodiments, at least one fastener 156 attaches the handle 152 to the L-shaped front flange 500 of the bottom step. The at least one fastener 156 may simultaneously affix the skirt panel 150 to the bottom step 122.

As exemplified in FIG. 4, in some embodiments the handle 152 further includes a handle leg 157 extending in a perpendicular direction from either or both of the grasping portion 153 and bottom surface of the bottom step 122. The handle leg 157 includes a leg flange 158 defining a U-shaped channel 159 between a grasping portion 153 of the handle 152 and leg flange 158. The U-shaped channel 159 provides another location for a user to grasp for manipulating the stair assembly 100, e.g., to extend extend/retract the linkage system 130. The leg flange 158 may also be configured to abut the ground G. In this way, the handle 152 of the stair assembly 100 includes a support structure which may be configured to provided stability to the deployed system.

The stair assembly 100 may also include one or more stabilizers 160 configured to support the linkage system 130 from the ground G. Where utilized, the stabilizer 160 may be attached to one or both sides of the linkage system 130, for example, at a location adjacent to the bottom step 122. However, the one or more stabilizers 160 may be attached adjacent to one or more of other steps 120,121 in addition to or in lieu of the bottom step 122. As illustrated in the exemplary embodiment of FIG. 5, the stabilizer 160 may be fixedly attached to the bottom outer scissor link 146 via at least one fastener 161. In this example, the stabilizer 160 includes a height adjustable leg 162 for positioning an attached foot 163 in contact with the ground G. When a user ascends or descends the extended staircase assembly 100 (the extended/deployed state illustrated in FIG. 1) the stabilizer 160 supports the linkage system 130 and the steps 120-122 fixedly attached thereto to limit/prevent unwanted movement (i.e., deflection or "wobble") of the stair assembly 100. In the stored position, the stabilizers 160 are hidden within the confines of the vehicle cavity 38 on either side. As the linkage system 130 is extended to fold out into a deployed/extended position, the stabilizer 160 is oriented into a substantially vertical position perpendicular to the ground G. In some embodiments, the foot 163 is attached to the bottom distal end of the adjustable leg 162 and includes a substantially planar pad 169 for contacting the ground G. Extending the adjustable leg 162, allows for the substantially planar pad 169 of the foot 163 to rest on the ground G, providing support to the stair assembly 100. The one or more stabilizers 160 are an optional feature and, in other nonillustrated embodiments, the stair assembly 100 does not include any such stabilizers 160.

In some embodiments, the stabilizer 160 includes a hollow tube member 164 configured to slidably house the adjustable leg 162. That is, a length of the adjustable leg 162 is received by the hollow tube member 164 and allowed to extend and retract to a desired height H. In the exemplary embodiment illustrated in FIG. 5, the hollow tube 164 member is shaped as a hollow rectangular prism and configured to at least partially house the extendable leg 162, and the extendable leg 162 is configured as an elongate member with a substantially rectangular cross-section geometry corresponding to the interior of the hollow tube member 164. It is to be appreciated, however, that the shape of the leg 162 and the hollow tube member 164 is not limiting and that other shapes, e.g., a cylindrical hollow tube member, may substituted without delineating from the scope of the present disclosure.

The stabilizer 160 may be configured such that it may be selectively locked in one or more extended positions. For example, the stabilizer 160 may include a locking mechanism for selectively adjusting the extended portion of the adjustable leg 162. In these embodiments, the adjustable leg 162 may include at least one locking surface having a plurality of locking features, such as a plurality of spaced apart teeth 165 and grooves 166. A lever 170 and locking tab 171 are pivotally fastened at a rocker point 175 to the hollow tube member 164, allowing the lever 170 and locking tab 171 to rock into engaged and disengaged positions with the spaced apart teeth 165 and grooves 166. The locking tab 171 may extend beyond the bottom distal end 167 of the tube member 164 such that the locking tab 171 extends toward and is able to engage the plurality of teeth 165 and grooves 166 of the adjustable leg 162. That is, the locking tab 171 is received by each of the grooves 166 and, when in a locked position, prevents a sliding movement of the adjustable leg 162 with respect to the tube member 164.

A biasing member 172 may be placed between the lever 170 and tube member 164 that urges the lever/locking tab 170,171 into a locked position, wherein the tab 171 projects into and is received by one of the plurality of grooves 166. In some embodiments and as illustrated in the exemplary embodiment of FIG. 5, the biasing member 172 is a spring, wherein the spring is configured to constantly apply an outward force to the lever 170 that rocks and urges the tab 171 into a locked engagement with a groove 166. Application of a sufficient force opposing the force of the biasing member 172 acting on the lever 170 rocks the tab 171 to disengage the plurality of grooves 166 and pivot such that the adjustable leg 162 is free to slide into a desired position with respect to the tube member 164. Removing the opposing force allows the biasing member 172 to apply a biasing force to pivot/rock the lever and urge the tab 171 in contact with the teeth 165 and grooves 166 of the adjustable leg 162. In some examples, the adjustable leg 162 is spring loaded within the hollow tube member 164 such that, when unlocked, the adjustable leg 162 may be automatically extended at least a partial stroke length of the adjustable leg 162.

When a user deploys the stair assembly 100 from a retracted state (i.e. where the stair assembly 100 is stored under the vehicle 20), the user pulls outwardly on the handle 152 to extend the linkage system 130. In the same motion, the user is able to simultaneously lower the handle 152 and the bottom step 122 towards the ground G, to a full extension and use position. With the integral stabilizer 160 mechanism now in a use position, the user is able to press or kick the lever 170 releasing the tab 171 to a disengaged position, allowing the adjustable leg 162 to fall under the force of gravity from the tube member 164 to a desired height H, e.g., wherein the planar pad 169 of the foot 163 rests on the ground G.

In some examples, the stair assembly 100 is configured such that extension of the linkage system 130 automatically deploys the stabilizer 160 into the use position and partial extended state. In the same motion of deploying the stair assembly 100 from the stored position (see, e.g., FIG. 4) into the deployed position (see, e.g., FIG. 2), the stabilizer 160 affixed to the linkage system 130 automatically moves into a use position (or state) where the adjustable leg 162 is sufficiently extended from the hollow tube member 164 a distance to where the foot 163 may rest on the ground G (i.e., an extended position or state). In this manner, the one or more stabilizers 160 may automatically contact the ground G to support to the stair assembly 100 when the linkage system 130 is fully extended into the deployed position, without having to manually manipulate the one or more stabilizers 160 to extend or retract the adjustable leg 162 thereof to contact the ground G. Moreover, the one or more stabilizers 160 may be arranged on the linkage system 130 such that the linkage system 130 may be fully retracted to position the stair assembly 100 in the stored position when the adjustable leg 162 is extended from its associated stabilizer 160 (i.e., when the adjustable leg 162 is in the extended/use state). Thus, where the adjustable leg 162 has been extended from its associated tube 164 a distance sufficient to contact the ground G (and locked in that extended position) during deployment of the stair assembly 100, the stair assembly 100 may thereafter be manipulated into its stored position without having to retract the adjustable leg 162 into its respective tube 164. For example, when the stair assembly 100 is in the stored position where the linkage system 130 is fully retracted, such that the steps 120-122 are nested together in their vertical orientations (i.e., vertically nested) between the support brackets 102, the one or more stabilizers 160 are "tucked-in" proximate to the neighboring scissor links of the linkage system 130 and a clearance may exist between the stabilizer 160 and a lower most portion of the linkage system 130. Here, the clearance may thereby permit full retraction of the linkage system 130 to position the stair assembly 100 into its stored position when the adjustable leg 162 is extended from its associated stabilizer 160. As exemplified in FIG. 4, a clearance exists between the foot 163 (and the pad 169) of the stabilizer 160 and the rivet (positioned at the pivot point 151 between scissor links 144,145) such that the stabilizers 160 may be "tucked-in" proximate to the neighboring scissor links of the linkage system 130 and the steps 120-122 without the adjustable leg 162 in the extended state interfering with other components. In this manner, where the adjustable leg 162 has been previously extended such that it is currently in the extended state (to contact the ground G, e.g., as illustrated in FIGS. 2 and 5), the linkage system 130 and the stabilizers 160 may still be fully retracted within the cavity 38, such that the stair assembly 100 is in the stored position, without any interference resulting from extension of the adjustable leg 162 contacting other components. Then, as the linkage system 130 is expanded to deploy the stair assembly 100, the stabilizer 160 translates outward and downward into a position lower than the lower most portion of the linkage system 130 (i.e., the rivet at the pivot point 151) where the adjustable leg 162 of the stabilizer 160 may already be sufficiently extended to contact the ground G without any manual manipulation of the stabilizer 160. Thus, extension of the linkage system 130 may automatically deploy the stabilizer 160 in an extended state where it may contact the ground G.

Figure 6:
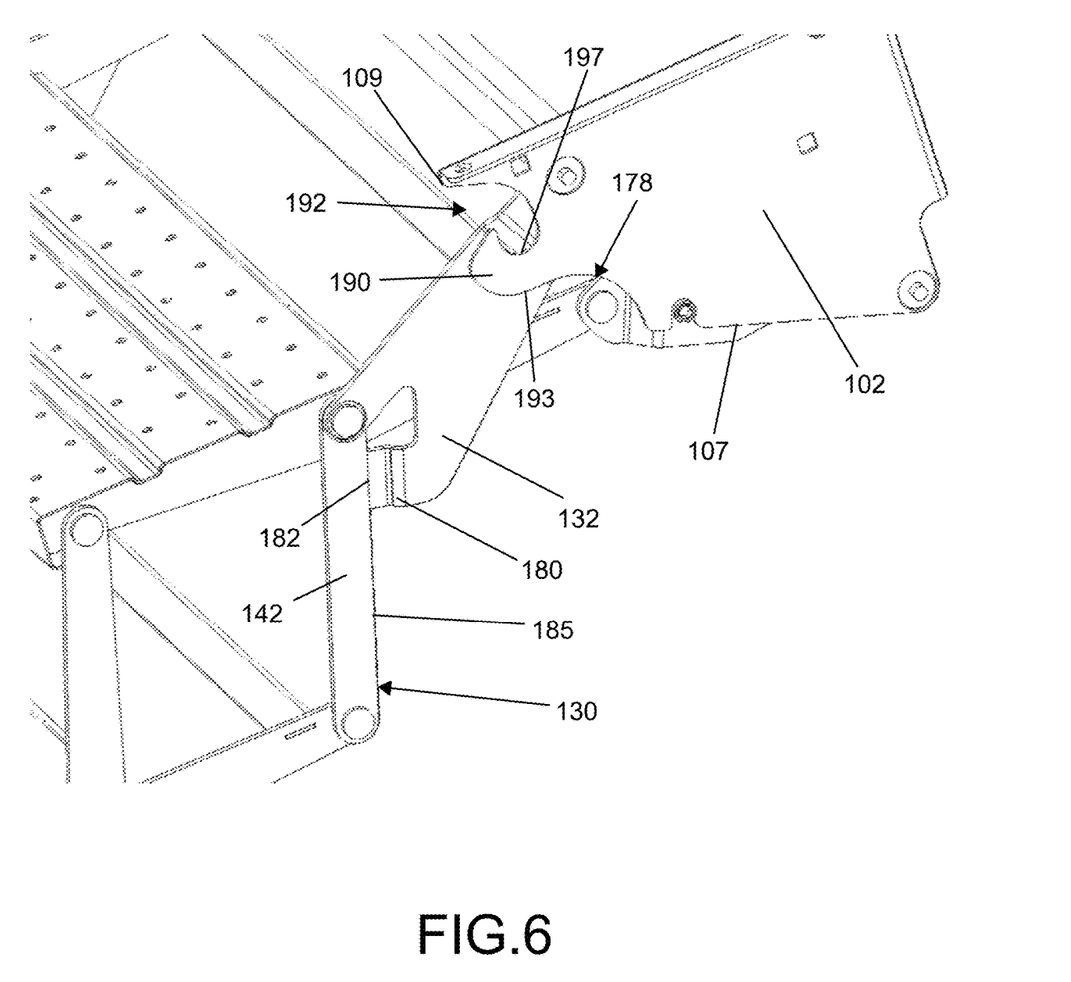
FIG. 6 is a perspective view of exemplary stair assembly having a stop member and front hook in accordance with the present disclosure.
Figure 7:
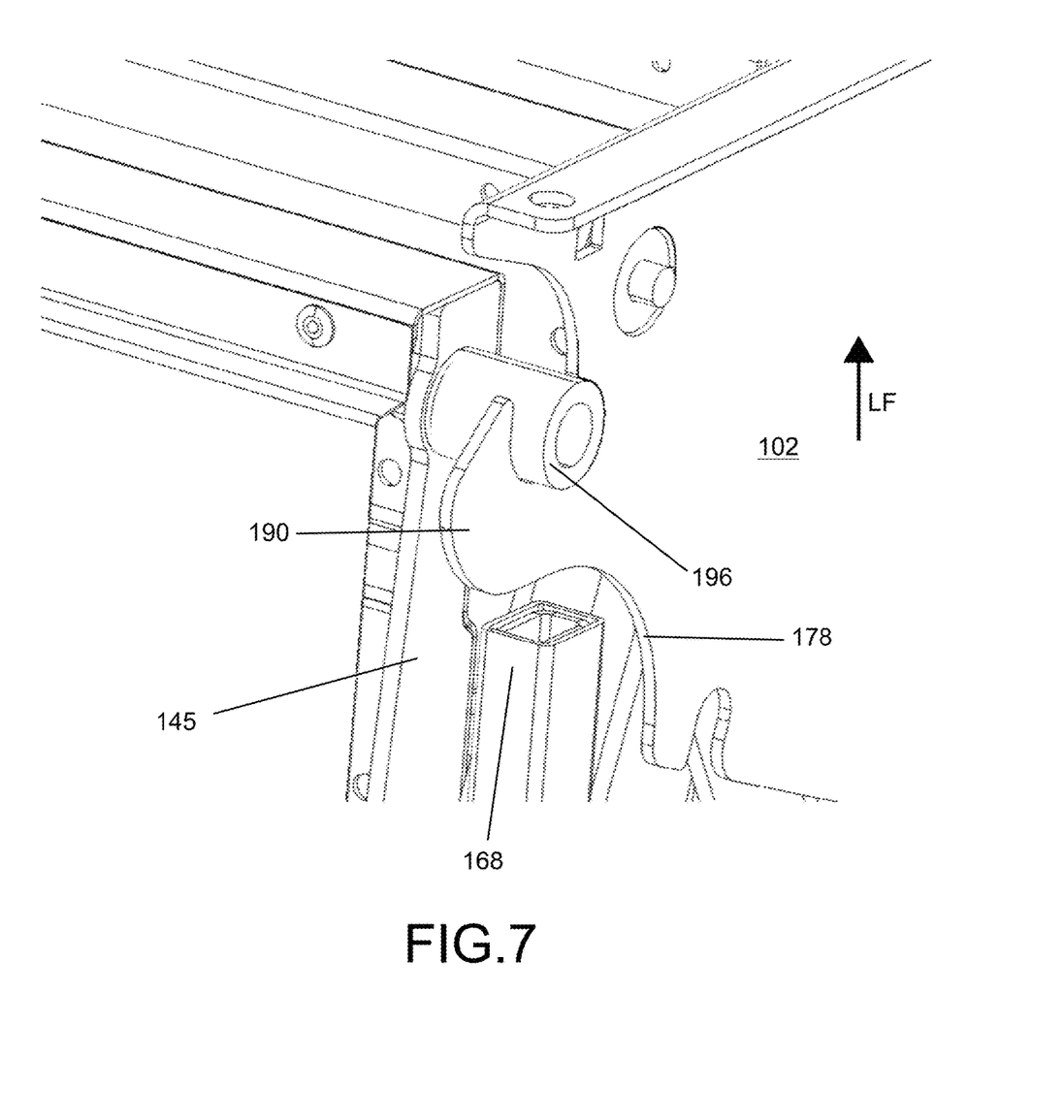
FIG. 7 is a perspective view of exemplary stair assembly with a locking projection engaged with a support bracket front hook in accordance with the present disclosure.

In some embodiments, and with particular reference to FIGS. 4 and 6-7, the support bracket 102 further includes an arcuate cutout 178 adjacent the front edge 109 and bottom edge 107. The cutout 178 provides open space to allow the storage of the stabilizer 160 when the stair assembly is in its retracted/storage position. More particularly, the arcuate cutout 178 allows for the top distal end 168 of the tube member 164 to store and rotate during deploy/retraction without interference from the support bracket 102.

In some embodiments, and with particular reference to FIG. 6, the stair assembly 100 includes at least one stop member 180 configured to restrict the movement of the linkage system 130 beyond a predetermined extension. More specifically, the stop member 180 limits the motion of the plurality of scissor links 141-146 such that the plurality of steps 120-122 are not able to rotate beyond the horizontal position illustrated in FIG. 2. The stop member 180 may be fabricated as a projection integrated into a bottom portion of the front linkage bar 132. The stop member 180 includes a front facing abutment surface 182 configured to abut a rear facing rear edge 185 of the top outer scissor link 142. The contact of the rear edge 185 of the scissor link 142 to the stop member 180 prevents rotation about the scissor link pivot points such that the plurality of steps 120-122, fixedly attached the scissor links of the linkage system 130, are limited to rotating into a desired horizontal position in the extended state but not beyond such desired horizontal position. In some embodiments, the stop member 180 is located on one of the pair of front linkage bars 132, i.e., one stop member on either side of the linkage system 130. In other embodiments, a stop member 180 is located on both front linkage bars 132 of linkage system 130. In other words, a stop member 180 is present on both sides of the linkage system 130. Here, the stop member 180 is flared inward, such that the front facing abutment surface 182 thereof is co-planar with the scissor link 142 to thereby permit the front facing abutment surface 182 to contact the rear edge 185 of the scissor link 142. Thus, in the illustrated example, the stop member 180 and the front facing abutment surface 182 thereof are oriented in the same plane in which the scissor link 142 rotates, but the stop member 180 and the front facing abutment surface 182 thereof are oriented in a different plane than the front linkage bars 132. Thus, in the illustrated example, the stop member 180 extends into the plane of rotation of the scissor link 142 so as to engage the scissor link 142 and inhibit further rotation beyond the designed constraints. In addition, while the stop member 180 extends inward into the plane of rotation of the scissor link 142, the stop member 180 may be configured to not interfere/impede rotation of other scissor links. In the illustrated example, the stop member 180 does not extend into the plane of rotation of the top inner scissor link 141, such that the stop member 180 does not contact or impede movement of the top inner scissor link 141 during its articulation.

With reference to FIGS. 6 and 7, the stair assembly 100 also includes a front hook 190 projecting forward and outwardly from the front edge 109 of each support bracket 102. The front hook 190 is generally co-planar with the support bracket 102 and the open hook portion partially defines an arcuate guide channel 192 configured to receive and guide a locking projection 196 fastened to the front distal end of the bottom inner scissor link 145. The arcuate guide channel 192 extends from the front edge 109 of the support bracket 102 toward the rear 105 and bottom edge 107 of the support bracket 102. In some embodiments and as illustrated in the exemplary embodiment of FIG. 6, the bottom edge 193 of the hook 190 is continuous with and extends outwardly therefrom, the arcuate cutout 178 in the support bracket 102.

The locking projection 196 projects outwardly from and perpendicularly to, the bottom inner scissor link 145. The locking projection 196 is located proximate to the front end of the bottom inner scissor link 145 and is configured such that when placing the stair assembly 100 in the retracted/storage state (illustrated in FIG. 4), the locking projection 196 travels within arcuate guide channel 192 to arcuate support surface 197 of the front hook 190. The support surface 197 of front hook 190 supports the weight of stair assembly 100 and secures steps 120-122 in the retracted position via the gravitational force. The hook 190 prevents initial extension directly perpendicular to the vehicle body, keeping steps 120-122 in the retracted position. In order to deploy stair assembly 100 to its extended/deployed position, a force opposing gravity (i.e., a lifting force, in the general direction of vector LF in FIG. 7) is applied to free the locking projection 196 from support surface 197 and guide channel 192 of hook 190. Upon clearance of the locking projection 196 from the hook 190 along the arcuate guide channel 192, application of an outward force (i.e., a pulling force) is able to extend the linkage system 130 and deploy the steps 120-122 to a horizontal orientation allowing one to easily enter/exit the vehicle 20. Thus, a user is able to grasp the handle 152 and, in a singular fluid motion, lift up and then pull out to extend the linkage system 130 and place the stair assembly 100 and each of the plurality of steps 120-122 in a horizontal deployed state. This is in direct contrast to other prior art systems that require users to apply extra motions to complete deployment a stair system including but not limited to flipping a final tread.

In some embodiments, the locking projection 196 is a generally cylindrically shaped bushing. The bushing may be composed of a polymeric material, for example and without limitation, ABS plastic, that is able to slidably contact the edges of the arcuate guide channel 192 and hook 190. In other embodiments, the locking projection 196 is rotatably attached to the bottom inner scissor link 145 such that contact with the edges of the arcuate guide channel 192 and hook 190 cause the locking projection 196 to rotate/roll.

The components of the stair assembly 100, including components of the linkage system 130, steps 120-122 and support brackets 102 are composed of a suitable metal to provide strength and rigidity. Suitable metals include but are not limited to aluminum, steel, and alloys thereof. While metals are expressly described herein, it is to be understood that any other material suitably providing such qualities could be utilized without deviating from the scope of the present disclosure.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

A more complete understanding of the components, processes and apparatuses disclosed herein can be obtained by reference to the accompanying drawings. These figures are merely schematic representations based on convenience and the ease of demonstrating the present disclosure, and, therefore, are not intended to indicate relative size and dimensions of the devices or components thereof and/or to define or limit the scope of the exemplary embodiments.

Although specific terms are used in the above description for the sake of clarity, these terms are intended to refer only to the particular structure of the embodiments selected for illustration in the drawings and are not intended to define or limit the scope of the disclosure. In the drawings and the above description, it is to be understood that like numeric designations refer to components of like function.

The singular forms "a," "an," and "the" include plural referents unless the context clearly dictates otherwise.

Numerical values in the specification and claims of this disclosure should be understood to include numerical values which are the same when reduced to the same number of significant figures and numerical values which differ from the stated value by less than the experimental error of conventional measurement technique of the type described in the present disclosure to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

As used herein, the terms "generally" and "substantially" are intended to encompass structural or numerical modifications which do not significantly affect the purpose of the element or number modified by such term.

What is claimed is:

1. An extending and retracting stair assembly for a vehicle comprising:
    a pair of substantially flat, spaced apart, support brackets configured to mount to the vehicle, each support bracket having an inner facing surface and an outer facing surface;
    a linkage system supporting a plurality of attached steps and configured to move the plurality of attached steps from a stored position, where the attached steps are vertically oriented and located between the pair of support brackets, to a deployed position, where the attached steps are horizontally oriented and extending outwardly from the vehicle;
    a front linkage bar pivotally connected to the inner surface of each support bracket;
    a rear linkage bar pivotally connected to the inner surface of each support bracket; and
    a set of scissor links, pivotally connected to each support bracket via the front linkage bar and rear linkage bar, wherein each set of scissor links includes a plurality of scissor links connected to one another at scissor link ends and are pivotally connected at each scissor link center.

2. The stair assembly according to claim 1, further comprising at least one crossbar stop member configured to prevent movement of the plurality of stairs beyond the horizontally deployed position.

3. The stair assembly according to claim 1, further comprising at least one stabilizer fixedly connected to the linkage system configured to support the stair assembly in an extended state via contact with a ground surface.

4. The stair assembly according to claim 3, wherein the at least one stabilizer is automatically deployed in the extended state when the linkage system articulates the plurality of attached steps into the deployed position.

5. The stair assembly according to claim 3, wherein the at least one stabilizer comprises an adjustable leg configured to slidably engage a hollow tube member.

6. The stair assembly according to claim 1, further comprising a skirt panel fixedly connected to a bottom step of the plurality of attached steps.

7. The stair assembly according to claim 6, wherein the skirt panel is substantially planar with a skirt of the vehicle when the stair assembly is in the stored position.

8. The stair assembly according to claim 1, further comprising a handle fixedly connected to a bottom step of the plurality of attached steps, the handle comprising a grasping portion configured to ergonomically receive an operator hand to manipulate the linkage system.

9. The stair assembly according to claim 1, further comprising at least one stabilizer arranged on the linkage system to support the attached steps via contact with a ground surface when in the deployed position.

10. The stair assembly according to claim 9, wherein the at least one stabilizer is extendible between an extended state and a retracted state.

11. The stair assembly according to claim 10, wherein linkage system is configured to retract the attached steps into the stored position when the at least one stabilizer is in the extended state.

12. The stair assembly according to claim 10, wherein linkage system is configured to move the attached steps, from the stored position with the at least one stabilizer being in the extended state, into the deployed position.

13. An extending and retracting stair assembly for a vehicle comprising:
    a pair of substantially flat, spaced apart, support brackets configured to mount to the vehicle, each support bracket having an inner facing surface and an outer facing surface; and
    a linkage system supporting a plurality of attached steps and configured to move the plurality of attached steps from a stored position, where the attached steps are vertically oriented and located between the pair of support brackets, to a deployed position, where the attached steps are horizontally oriented and extending outwardly from the vehicle,
    wherein each of the support brackets includes hook extending frontward from a support bracket front edge, each hook defining an arcuate guide channel configured to receive and guide a locking projection connected to and extending perpendicularly from, a bottom scissor link of the linkage system.

14. A method of deploying an extendable stair assembly mounted to a vehicle comprising:
    i. providing the extendable stair assembly having a stored position and deployed position comprising:
        a pair of substantially flat, spaced apart, support brackets configured to mount to a vehicle, each support bracket having an inner facing surface, an outer facing surface, and a front hook extending outwardly from a support bracket front edge, wherein each front hook defines an arcuate guide channel in the support bracket that is configured to receive and guide a locking projection connected to and extending perpendicularly from a bottom step, and a linkage system configured to move a plurality of attached steps from a vertically orientated stored position located between the pair of support brackets to a horizontally oriented deployed position extending outwardly from the vehicle;

ii. applying a lifting force opposing gravity to free the locking projection from the support bracket hook and guide channel; and, iii. applying a pulling force substantially perpendicular to a side of the vehicle, extending the linkage system and deploying each of the steps to a horizontal orientation.

15. The method according to claim 14, wherein the extendable stair assembly further includes at least one stabilizer arranged on the linkage system to support the attached steps.

16. The method according to claim 15, wherein the at least one stabilizer is extendible between an extended state and a retracted state.

17. The method according to claim 16, wherein the extendable stair assembly is configured to automatically deploy the at least one stabilizer into the extended state.

18. The method according to claim 17, wherein the extendable stair assembly automatically deploys the at least one stabilizer into the extended state during extension of the linkage system.

19. The method according to claim 18, wherein the at least one stabilizer is configured to contact a ground surface when the linkage system is fully deployed.

* * * * *